May 17, 1938.  H. T. KRAFT  2,117,766
SKID PREVENTING DEVICE
Filed April 24, 1936
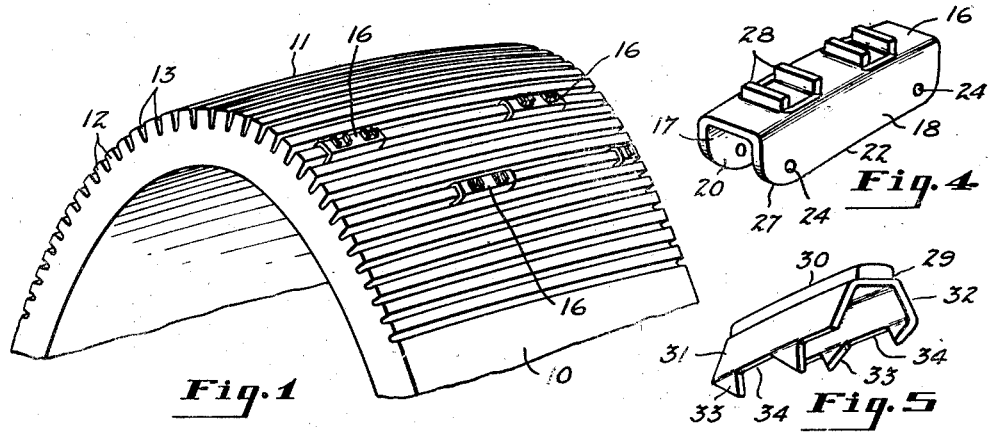
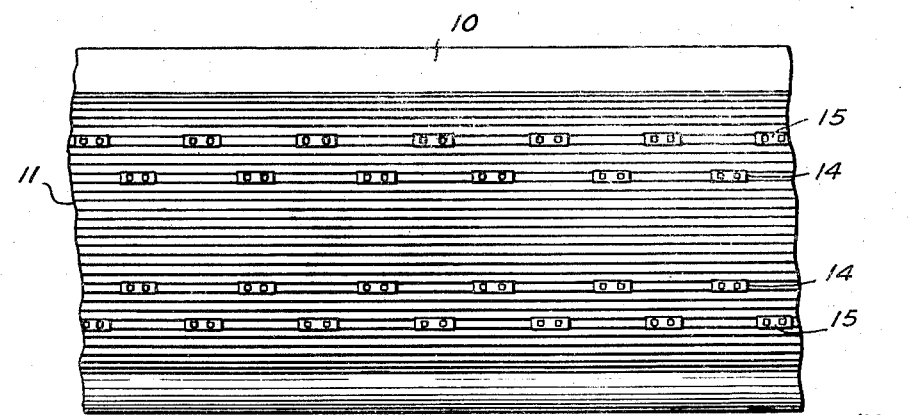
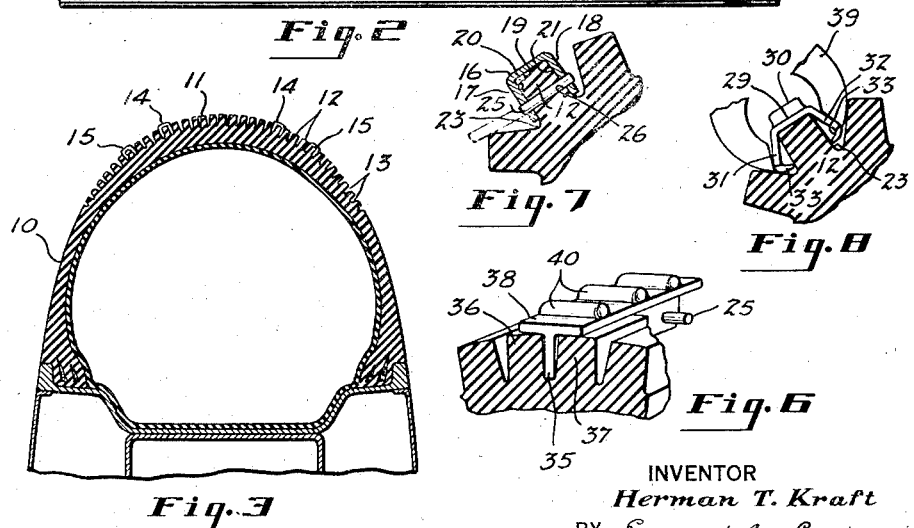
INVENTOR
Herman T. Kraft
BY Evans & McCoy
ATTORNEYS Patented May 17, 1938

2,117,766

UNITED STATES PATENT OFFICE 2,117,766

SKID PREVENTING DEVICE

Herman T. Kraft, Akron, Ohio, assignor to The General Tire & Rubber Company, Akron, Ohio, a corporation of Ohio Application April 24, 1936, Serial No. 76,144

12 Claims. (Cl. 152—14)

This application is a continuation in part of my co-pending application Serial No. 57,177, filed January 2, 1936, for Skid-preventing device for use with vehicle tires.

The present invention relates to skid-preventing devices for use with vehicle tires and particularly to such devices to be affixed directly to the tread of a tire, and the method of attachment.

Among the objects of this invention is the provision of skid-preventing devices for vehicle tires which are light in weight, simple in construction, economical to manufacture, and easily and quickly assembled to the tire tread, and which will neither impair the original resiliency and pliability of the tire nor injure the tire at high vehicle speeds on dry road surfaces.

Another object is to provide a device of this character having a road-engaging surface of relatively hard, wear-resisting material and the remainder of the device of relatively soft malleable material.

Another object is to provide skid-preventing devices for vehicle tires which can readily be attached to and detached from a tire, which will not interfere with the riding qualities of the tire and which can be carried directly by the tire tread, and which may be left assembled to the tire tread even though their use is not required, without causing excessive wear of either the tire or the devices themselves.

With the above and other objects in view, the present invention consists of certain features of construction and assembly and combination of parts to be hereinafter described with reference to the accompanying drawing, in which:

Figure 1 is a fragmentary elevation in perspective of a vehicle tire showing a plurality of devices embodying the invention affixed to the tread thereof;

Fig. 2 is a fragmentary plan view of a vehicle tire tread showing a number of these devices embodying the invention, affixed to the tread thereof;

Fig. 3 is a fragmentary section through an airplane wheel, showing a number of devices embodying the invention affixed to the tire tread thereof;

Fig. 4 is an illustration in perspective of a device embodying the invention;

Fig. 5 is an illustration in perspective of a modified form of device embodying the invention;

Fig. 6 is a view in perspective of still another modification of the invention;

Fig. 7 is a fragmentary section of a vehicle tire showing the manner in which the preferred embodiment of the invention may be affixed to the tread of a vehicle tire;

Fig. 8 is a section similar to Fig. 7 showing the manner in which the modification of my invention illustrated in Fig. 5 may be affixed to the tread of a vehicle tire.

The skid-preventing devices of the present invention are particularly adaptable to vehicle tires of the type disclosed in my copending application Serial No. 754,104, filed November 21, 1934, now Patent No. 2,048,635 and such as the tire 10 shown in Figs. 1, 2, and 3, having a tread 11 comprised of relatively narrow, circumferentially extending flexible ribs 12 axially spaced by narrow grooves 13.

It is to be understood, however, that the devices about to be described are also adaptable for use with any tire tread having circumferentially arranged grooves extending either partially or completely around the tire tread.

Broadly, the present invention resides in providing a plurality of flat elements of hard, wear-resisting material such as high carbon or plow steel, or a metal known to the trade as "Stellite", secured at spaced and preferably staggered intervals about the road-engaging surface of the vehicle tire tread, and provided with a flange positioned in a groove of the tread. The road-engaging portion comprises the flat portion of the device, and the flange is for anchoring the device. These elements are so arranged that they will engage the road surface and upon tendency of the vehicle to skid, either sideways or in the direction of travel of the vehicle, effectively prevent or minimize skidding and slipping, particularly on wet or icy road surfaces, and wet or soggy airplane landing fields.

In the drawing I have shown the devices arranged in a plurality of circumferential rows around the periphery of the tread portion of the tire. In vehicle tires of the type shown in Fig. 3, which have a deflection proportional to the load sustained, it will be seen that under light loads only the skid-prevening elements in rows 14 will be in contact with the road surface, while under heavier loads, when the tire is substantially deflected so that a larger area of the tread portion is in contact with the road surface, then the skid-preventing elements in rows 15 will also engage the road surface and help to prevent skidding or slipping of the vehicle tire. This arrangement of the skid-preventing devices upon the tread of the tire is particularly advantageous in connection with tires used on aircraft where the load carried by the wheel varies, being a minimum just before the wheel leaves the ground in a take-off and at a maximum sometime just after the wheels touch the ground in landing or in cases of exceptional load, such as when a poor landing is made, and the wheels and tires are subjected to a sudden impact with the landing field surface. It will thus be seen that the skid-preventing devices can be arranged so that the vehicle wheel will have more resistance to skidding or slipping when it is subjected to great loads than when light loads are being carried.

Being relatively narrow and spaced apart at circumferential and transverse intervals and independently secured to the tread of the tire, the skid-preventing elements will not impair the resiliency and pliability of the tire tread and will not substantially injure the tire even when the vehicle is operated at high speeds over dry pavements.

These elements may assume several different forms, the preferred embodiment shown in Figs. 4 and 7 in the form of an elongated channel or U-shape comprising a substantially flat road-engaging portion 16 and two flanges or leg portions 17 and 18. The respective skid-preventing elements are of such a size that each element will substantially enclose a length of one of the circumferential ribs 12 with the road-engaging portion 16 of the skid-preventing device seating against the outer tread portion 19 of the particular rib over which the element is positioned. The legs or flanges 17 and 18 fit into the grooves 13 with their inner faces 20 and 21 abutting against the sides of the rib 12. The bottom edges 22 of the flanges 17 and 18 seat in the bottom 23 of the grooves 13. Suitable apertures 24 are provided near the edge 22 of the flanges 17 and 18 to receive anchoring pins 25. These anchoring pins are made of any suitable material such as iron or steel and are positioned in holes 26 in the rib 12. The corners 27 of the flanges 17 and 18 may be rounded as shown in Fig. 4 to prevent gouging and injury to the tire. Suitable barbs 28 on the road-engaging surface 16 of the element increase the skid-preventing properties of the device. The elements may be assembled to an inflated tire in place on a wheel, but it is preferred to have the tire in a deflated condition, removed from the wheel, so that the portions of the tire carcass adjacent the rib to which the element is to be attached may be moved toward each other in the manner shown in Fig. 7 so as to deform and arch that portion of the tire and separate the ribs 12.

If the element is positioned on a rib 12, as shown in Fig. 7, and the pin 25 heated to a temperature sufficient to substantially soften the rubber of the ribs 12, such as about 400° F., the pin 25 can be forced through the rib so that the extremities of the pin will be positioned in the apertures 24 and engage the flanges 17 and 18. In this manner the holes 26 will be burned in the ribs and when the pin 25 has cooled it will be firmly anchored therein to effectively secure the skid-preventing element in place.

The skid-preventing element shown in Figs. 5 and 8 is constructed of a relatively soft workable material such as sheet iron. In order to give it long wearing qualities the road-engaging surface 29 is provided with a relatively hard and abrasive road-contacting portion 30 which may be of Stellite or high carbon steel. The flanges 31 and 32 are similar to the flanges 17 and 18 of the element shown in Fig. 4, except that they have laterally extending barbs 33 on the bottom edges 34. If the rib to which this element is to be attached is narrow it is desirable to stagger the barbs 33 as shown in Fig. 5, so that the barbs on the flange 31 will not be directly opposite the barbs on the flange 32.

To fix the skid-preventing element of the type shown in Fig. 5 to a vehicle tire it is preferable to have the tire deflated with the ribs separated as described above, although it is also possible to fix the element to the ribs without taking the tire off the wheel by inserting a suitable implement such as a screwdriver between the ribs in order to separate them. As shown in Fig. 8, the legs 31 and 32 are not parallel but are angularly disposed so that the clear space between the ends of the barbs on the flange 31 and the barbs on the flange 32 is sufficient to allow the element to be placed over a rib 12. It is preferable to first heat the element to a temperature which will substantially soften the rubber, such as about 400° F. In this heated condition the element is placed over a rib 12 with the road-engaging portion 29 seating on the portion 19 of the rib surface which normally engages the road. With a suitable tool, such as pinchers 39, the flanges 31 and 32 as shown in Fig. 8 are forced into a substantially parallel position with their inner faces abutting the sides of the rib 12 and with the barbs 33 embedded in the ribs to secure the elements substantially permanently in place. The bottom edges 34 of the elements seat along and have bearing engagement with the bottom 23 of the grooves 13.

The modification shown in Fig. 6, instead of having two depending lugs or anchoring flanges, has one, 35, which abuts against two adjacent ribs 36 and 37. It will be noted that the road-engaging portion 38 overhangs both ribs 36 and 37 and bears against and is supported by them. Also, the pin 25 engages both ribs 36 and 37. Thus the flange 35 is securely held between two adjacent ribs. The modification shown in Fig. 6 is made of a relatively soft, workable material and the road-engaging portion 38 provided with relatively hard abrasive and wear-resistant mounds or configurations 40, which are formed of any suitable material such as carborundum, high carbon steel, or Stellite.

When the element is formed of a relatively soft workable material as described above having a wear-resistant material on the road engaging portion, a serviceable and efficient skid-preventing device is provided. The relatively soft portion of the element prevents its being broken or chipped, due to impact with hard objects or sudden stresses, and the hard and abrasive material on the road-engaging portion resists being worn away and gives the element a long life.

It is, of course, contemplated to construct the skid-preventing device in various modified forms of which only a few have been shown and described and it is to be understood that numerous modifications of the constructions shown may be resorted to without departing from the spirit of this invention as defined in the appended claims.

What I claim is:

1. In a vehicle tire having spaced, circumferentially arranged narrow ribs in the tread portion thereof, said ribs separated by narrow, circumferentially arranged grooves, a plurality of skid-preventing elements independently secured to the tread portion in spaced relation, each of said elements having a road-engaging portion overlying a part of the tread of the tire and an anchoring portion disposed in one of the grooves.

2. In a vehicle tire having spaced, circumferentially arranged narrow ribs in the tread portion thereof, said ribs separated by narrow, circumferentially arranged grooves, a plurality of independently secured skid-preventing elements, each of said elements having a road-engaging portion overlying a part of the tread of the tire, an anchoring portion disposed in one of the grooves, and barbs on the anchoring portion arranged to penetrate the adjacent rib for anchoring the elements in place.

3. In a vehicle tire having spaced, circumferentially arranged narrow ribs in the tread portion thereof, said ribs separated by narrow, circumferentially arranged grooves, a plurality of skid-preventing elements independently secured to the tread, each of said elements having a road-engaging portion overlying a part of the tread of the tire and an anchoring portion disposed in one of the grooves, means for anchoring the elements in position, comprising an aperture in the anchoring portion, a hole in the adjacent rib in alignment with the aperture, and a pin positioned in the aligned hole and aperture.

4. In a vehicle tire having spaced, circumferentially arranged narrow ribs in the tread portion thereof, said ribs separated by narrow, circumferentially arranged grooves, a plurality of skid-preventing elements independently secured in said tread portion, each of said elements having a road-engaging portion overlying a part of the tread of the tire and an anchoring portion disposed in one of the grooves, said anchoring portion having abutting engagement with the bottom of the groove, and means for anchoring the elements in position.

5. In a vehicle tire having spaced, circumferentially arranged narrow ribs in the tread portion thereof, said ribs separated by narrow, circumferentially arranged grooves, a plurality of skid-preventing elements independently secured in the tread, each of said elements having a road-engaging portion overlying a part of the tread of the tire and an anchoring portion disposed in one of the grooves, said road-engaging portion and anchoring portion being integrally formed of a relatively soft workable material, and a relatively hard, abrasive, wear-resistant material associated with said road-engaging portion to minimize the wear of said portion, and means for anchoring the elements in position.

6. In a vehicle tire having spaced, circumferentially arranged narrow ribs in the tread portion thereof, said ribs separated by narrow, circumferentially arranged grooves, a plurality of skid-preventing elements independently secured in the tread portion, some of the elements positioned on the tread so as to contact and engage the road surface under all loads, and the remainder of the elements positioned on the tread so that as the load on the vehicle tire is progressively increased the number of elements to contact and engage the road surface is progressively increased, each of said elements having a road-engaging portion overlying a part of the tread of the tire and an anchoring portion disposed in one of the grooves, and means for anchoring the elements in position.

7. In a vehicle tire having narrow ribs in the tread portion thereof, a plurality of skid-preventing elements disposed in spaced relation over the tread portion and independently secured thereto, each of said elements comprising an elongated U-shaped channel member of hard, wear-resisting material seated over a rib and having its legs in abutting engagement with the walls of the rib, and means for anchoring each of said elements in position.

8. In a vehicle tire having narrow ribs in the tread portion thereof, a plurality of skid-preventing elements disposed in spaced relation over the tread portion and independently secured thereto, each of said elements comprising an elongated U-shaped channel member of hard, wear-resisting material seated over a rib and having its legs in abutting engagement with the walls of the rib and the edge of a leg portion abutting the bottom of the groove between adjacent ribs, and means for anchoring each of said elements in position.

9. In a vehicle tire having narrow ribs in the tread portion thereof, a plurality of skid-preventing elements disposed in spaced relation over the tread portion, each of said elements independently secured to the tread and comprising an elongated U-shaped channel member of hard, wear-resisting material seated over a rib and having its legs in abutting engagement with the walls of the rim, and having a lateral projecting portion at substantially each end of the legs, the projections on each leg directed toward the other leg, and said projections extending into the adjacent walls of the ribs to anchor the element in position.

10. In a vehicle tire having narrow ribs in the tread portion thereof, a plurality of skid-preventing elements disposed in spaced relation over the tread portion, each of said elements independently secured to the tread and comprising an elongated U-shaped channel member of hard, wear-resisting material seated over a rib and having its legs in abutting engagement with the walls of the rib, and having a road-engageable portion disposed over the road-engaging surface of the tread portion provided with configurations to increase the frictional properties of the element, and means for anchoring each of said elements in position.

11. In a vehicle tire having narrow spaced grooves in the tread portion thereof, a plurality of skid-preventing elements disposed in spaced relation over the tread portion, each of said elements independently secured to the tread and comprising an elongated road-engaging member positioned to bear against the normally road-engaging surface of the tread and having a flange positioned in one of the said grooves, and means for anchoring the elements in position.

12. In a vehicle tire having narrow spaced grooves in the tread portion thereof, a plurality of skid-preventing elements disposed in spaced relation over the tread portion and independently secured thereto, each of said elements comprising an elongated T-shaped road-engaging member, said member provided with friction-increasing configurations on its road-engaging surface and said member positioned to bear against the road-engaging surface of the tread and having a central flange positioned in one of said grooves, and means for anchoring the element in position.

HERMAN T. KRAFT.